United States Patent [19]

Tanaka et al.

[11] Patent Number: 5,665,472

[45] Date of Patent: Sep. 9, 1997

[54] THERMAL TRANSFER SHEET

[75] Inventors: Konosuke Tanaka; Keiichi Ogawa, both of Tokyo-To, Japan

[73] Assignee: Dai Nippon Printing Co., Ltd., Japan

[21] Appl. No.: 703,604

[22] Filed: Aug. 23, 1996

[30] Foreign Application Priority Data

Aug. 25, 1995 [JP] Japan ................................ 7-238947

[51] Int. Cl.$^6$ ...................................................... B41M 5/20
[52] U.S. Cl. ......................... 428/402; 428/195; 428/206; 428/210; 428/325; 428/403; 428/406; 428/913; 428/914
[58] Field of Search ................................. 428/195, 206, 428/210, 325, 913, 914, 402, 403, 406

[56] References Cited

U.S. PATENT DOCUMENTS 5,252,521  10/1993  Roberts ................................ 501/17

FOREIGN PATENT DOCUMENTS 0 308 518 A  3/1989  European Pat. Off. .
59-198195  11/1984  Japan .

OTHER PUBLICATIONS

Patent Abstracts of Japan, vol. 009, No. 063 (M–365), 20 Mar. 1985 & JP 59 198195 A (DAinippon Insatsu KK), 9 Nov. 1984.

Patent Abstracts of Japan, vol. 018, No. 233 (C–1195), 28 Apr. 1994 & JP 06 024797 A (Asahi Glass Co. Ltd.), 1 Feb. 1994.

*Primary Examiner*—Pamela R. Schwartz
*Attorney, Agent, or Firm*—Parkhurst, Wendel & Burr, LLP

[57] ABSTRACT

There is provided a thermal transfer sheet comprising: a substrate film; and a hot-melt ink layer provided on one side of the substrate film, the hot-melt ink layer containing a bismuth oxide/borosilicate glass frit having a softening point of 400° to 500° C.

3 Claims, No Drawings

THERMAL TRANSFER SHEET

BACKGROUND OF THE INVENTION

1. Field of the Invention

This invention relates to a thermal transfer sheet having a hot-melt ink layer. More particularly, this invention relates to a thermal transfer sheet which is suitable for use in printing of an image having stability such as chemical resistance and heat resistance.

2. Background Art

A thermal transfer sheet comprising a substrate and a hot-melt ink layer provided on one side of the substrate has hitherto been used as a thermal transfer recording medium for use with a thermal printer, a facsimile machine, a bar code printer and the like.

In the conventional thermal transfer sheet, about 10 to 20 µm-thick paper, such as a capacitor paper or a paraffin paper, or about 3 to 20 µm-thick plastic film, such as a polyester film or cellophane, is provided as a substrate film, and a hot-melt ink of wax with a colorant, such as a pigment or a dye, incorporated therein is coated on the substrate film to form a hot-melt ink layer.

In use, heat and pressure are applied through the back side of the substrate film by means of a thermal head to melt the hot-melt ink layer in its areas corresponding to printing areas and to transfer the melt onto a printing paper, thereby conducting printing.

In recent years, in the production of members like assemblies of precision components, such as cathode-ray tubes and IC circuits, the above thermal transfer sheet is, in some cases, used in such a manner that bar codes are printed using the thermal transfer sheet on a label and the printed label is applied to members for purposes of process control. These members, in the course of production process, are treated under severe conditions, that is, undergo sintering at a high temperature of about 500° C. or surface treatment with a chemical, such as an acid. In this case, the bar code label is also exposed to the same severe conditions. In some thermal transfer sheets for such an application, a heat-resistant glass frit is dispersed in a binder for the hot-melt ink layer of the thermal transfer sheet (Japanese Patent Laid-Open No. 198195/1984).

In the case of the thermal transfer sheet containing a glass frit in the binder of the hot-melt ink layer, lead glass has been used as the glass frit, posing a problem that lead becomes a toxic water-soluble compound. Therefore, this thermal transfer sheet is unfavorable from the viewpoint of biological safety.

Further, when the conventional thermal transfer sheet is used for the above process control, the binder of the hot-melt ink layer is evaporated from the printed label upon heat treatment, leaving only a pigment. Therefore, the printed image is not fixed on the label, posing a problem that the image has no storage stability.

An object of the present invention is to solve the above problems and to provide a thermal transfer sheet which can provide an image having excellent storage stability and biological safety, that is, creating no toxicity, in applications where sintering at a high temperature and surface treatment with a chemical are conducted.

SUMMARY OF THE INVENTION

According to the present invention, the above object can be attained by a thermal transfer sheet comprising: a substrate film; and a hot-melt ink layer provided on one side of the substrate film, the hot-melt ink layer containing a bismuth oxide/borosilicate glass frit having a softening point of 400° to 500° C.

According to a preferred embodiment of the present invention, the bismuth oxide/borosilicate glass frit contains an alkali metal.

The construction of the thermal transfer sheet of the present invention is such that a hot-melt ink layer is provided on one side of a substrate film, the hot-melt ink layer containing a bismuth oxide/borosilicate glass frit having a softening point of 400° to 500° C. The use of a glass frit having a softening point falling within the above range and below the sintering temperature used (generally 400° to 500° C.) permits the glass frit to be melted so as to cover the color pigment, ensuring the fixation of a printed image onto a label. The softening point of the glass frit used is preferably about 5° C. lower than the sintering temperature.

Incorporation of an alkali metal in the glass frit can provide a printed image having improved resistance to surface treatment with an acidic chemical.

Further, since a bismuth oxide/borosilicate glass frit is used instead of the lead glass frit which creates toxicity, the printed image creates no toxicity and is biologically safe.

DETAILED DESCRIPTION OF THE INVENTION

Embodiments of the thermal transfer sheet of the present invention will be described in detail.

The thermal transfer sheet of the present invention comprises a substrate film and a hot-melt ink layer provided on one side of the substrate film.

In the thermal transfer sheet of the present invention, a matte layer may be optionally provided between the substrate film and the hot-melt ink layer in order to provide a matte print. Further, a backside layer may be optionally provided on the surface of the substrate film remote from the hot-melt ink layer.

Substrate film

The substrate film used in the thermal transfer sheet of the present invention is not particularly limited. Specifically, substrate films used in the conventional thermal transfer sheet as such may be used in the present invention, and, further, other substrate films may also be used.

Specific preferred examples of the substrate film include: films of plastics, such as polyester, polypropylene, cellophane, polycarbonate, cellulose acetate, polyethylene, polyvinyl chloride, polystyrene, nylon, polyimide, polyvinylidene chloride, polyvinyl alcohol, fluororesin, chlorineted rubber, and ionomar; papers such as condenser paper and paraffin paper; nonwoven fabrics; and laminates of these materials.

The thickness of the substrate film may be varied depending upon the material so as to have suitable strength and thermal conductivity. For example, it is preferably 2 to 25 µm.

Backside layer

A backside layer may be provided on the surface of the substrate film remote from the hot-melt ink layer from the viewpoint of preventing blocking between the thermal transfer sheet and a thermal head and, at the same time, of improving the slip property of the thermal transfer sheet.

The backside layer may be formed of preferably a binder resin with additives, such as a slip agent, a surfactant, inorganic particles, organic particles, and a pigment, incorporated therein.

Binder resins usable in the backside layer include, for example, cellulosic resins, such as ethyl cellulose, hydroxyethyl cellulose, hydroxypropyl cellulose, methyl cellulose, cellulose acetate, cellulose acetate butyrate, and nitrocellulose, vinyl resins, such as polyvinyl alcohol, polyvinyl acetate, polyvinyl butyral, polyvinyl acetal, polyvinyl pyrrolidone, acrylic resin, polyacrylamide, and acrylonitrile/styrene copolymer, polyester resin, and silicone-modified or fluorine-modified urethane resin.

The use of a crosslinked resin among them is preferred. In this case, a resin having several reactive groups, for example, hydroxyl groups, is used in combination with a crosslinking agent, such as a polyisocyanate.

The backside layer may be formed by dissolving or dispersing the above binder resin, containing additives, such as a slip agent, a surfactant, inorganic particles, organic particles, and pigments, in a suitable solvent to prepare a coating liquid, coating the coating liquid by means of conventional coating means, such as a gravure coater, a roll coater, or a wire bar, and drying the coating.

Matte layer

A matte layer may be provided between the substrate film and the hot-melt ink layer for the following purposes.

In the case of a thermally transferred image, the surface of the print is generally glossy and beautiful. In some cases, however, letters in the print are illegible. Therefore, matte prints are often desired. The matte layer may be provided, for example, as proposed by the present inventors (Japanese Patent Application No. 208306/1983), that is, between the substrate and the hot-melt ink layer by coating a dispersion of a suitable binder resin and an inorganic pigment, such as silica or calcium carbonate, in a suitable solvent and drying the coating.

The thickness of the matte layer is preferably about 0.1 to 1 µm. When the thickness is less than 0.1 µm, the function of the matte layer is unsatisfactory, while when it exceeds 1 µm, much printing energy is unfavorable necessary.

Hot-melt ink layer

The hot-melt ink layer contains a bismuth oxide/borosilicate glass frit having a softening point of 400° to 500° C., and the conventional colorant and binder. If necessary, various additives, such as mineral oils, vegetable oils, higher fatty acids, such as steatic acid, plasticizers, thermoplastic resins, and fillers, may be incorporated in the hot-melt ink layer.

Waxes usable as the binder include, for example, microcrystalline wax, carnauba wax, and paraffin wax. Further, other various waxes, such as Fischer-Tropsch wax, various polyethylenes having low molecular weights, Japan wax, beeswax, spermaceti, insect wax, wool wax, shellac wax, candelilla wax, petrolatum, polyester wax, partially modified wax, fatty acid esters, and fatty acid amides. Among them, those having a melting point of 50° to 85° C. are preferred. When the melting point is below 50° C., a problem of storage stability occurs, while when the melting point exceeds 85° C., the sensitivity is unsatisfactory.

Resins usable as the binder include, for example, ethylene/vinyl acetate copolymer, ethylene/acrylic ester copolymer, polyethylene, polystyrene, polypropylene, polybutene, petroleum resin, vinyl chloride resin, vinyl chloride/vinyl acetate copolymer, polyvinyl alcohol, vinylidene chloride resin, methacrylic resin, polyamide, polycarbonate, fluororesin, polyvinylformal, polyvinyl butyral, acetyl cellulose, nitrocellulose, polyvinyl acetate, polyisobutylene, ethyl cellulose, and polyacetal. Resins, having a relatively low softening point, for example, a softening point of 50° to 80° C., which have hitherto been used as a heat-sensitive adhesive, are particularly preferred.

The bismuth oxide/borosilicate glass frit used in the present invention comprises $Bi_2O_3$ and $B_2O_3$ as essential components. In the bismuth oxide/borosilicate glass frit, the contents of $Bi_2O_3$, $B_2O_3$, $SiO_2$ and the like are regulated to bring the softening point to 400° to 500° C. and to form a network structure. For example, a glass frit comprising, by weight, 75 to 85% of $Bi_2O_3$, 12 to 18% of $B_2O_3$, 0.1 to 5.0% of $SiO_2$, 0.05 to 3.0% of $CeO_2$, 0.1 to 3.0% of $Li_2O$, and 0.05 to 3.0% of $Na_2O$ has a softening point of 400° to 500° C.

Further, the average particle diameter of the bismuth oxide/borosilicate glass frit is preferably 0.1 to 10 µm from the viewpoint of good dispersibility in the formulation of an ink.

A bismuth oxide/borosilicate glass frit with an oxide of an alkali metal, such as sodium, potassium or lithium, added thereto is preferred from the viewpoint of improving the resistance of the printed image to surface treatment with an acidic chemical.

The colorant may be selected from the conventional organic or inorganic pigments, and colorants having satisfactory color density and causing neither color change nor fading upon exposure to light, heat and the like. For example, inorganic colorants, such as carbon black, graphite, a sulfide and oxide of iron, titanium, nickel, chromium, manganese, cobalt, cadmium and like, and compound oxides of these metals, are particularly preferred.

The color of the colorant is not limited to cyan, magenta, yellow, and black, and colorants of various colors may be used.

Further, a thermally conductive material may be incorporated as a filler for the binder into the hot-melt ink layer from the viewpoint of imparting good heat conductivity and hot-melt transferability. Fillers usable herein include, for example, carbonaceous materials, such as carbon black, and metals and metallic compounds, such as aluminum, copper, tin oxide, and molybdenum disulfide.

The content of the colorant is preferably 5 to 80% based on the solid content of the whole ink layer, and the content of the bismuth oxide/borosilicate glass frit is preferably 1 to 60% based on the solid content of the whole ink layer. The proportion of the weight of the bismuth oxide/borosilicate glass frit to the weight of the colorant is preferably 50 to 200% from the viewpoint of the storage stability of an image in the print.

The hot-melt ink layer may be formed by formulating the above colorant component, binder component, bismuth oxide/borosilicate glass frit, and optionally a solvent component, such as water or an organic solvent, to prepare a coating liquid for a hot-melt ink layer and coating the coating liquid by any conventional coating method, such as hot-melt coating, hot-lacquer coating, gravure coating, gravure reverse coating, or roll coating. Alternatively, it may be formed by using a coating liquid of an aqueous or nonaqueous emulsion.

The thickness of the hot-melt ink layer should be determined so as to offer a good balance between the necessary print density and the heat sensitivity. It is generally about 0.to 30 µm, preferably about 1 to 20 µm.

The thermal transfer sheet of the present invention can, of course, cope with color printing, and thermal transfer sheets for multi-color printing also fall within the scope of the present invention.

The following examples further illustrate the present invention but are not intended to limit it. In the following examples and comparative examples, all "parts" or "%" are by weight unless otherwise specified.

EXAMPLE 1

A 4.5 μm-thick polyethylene terephthalate film was provided as a substrate film, and a coating liquid, for a matte layer, having the following composition was coated on one side of the substrate film by means of a gravure coater, and the coating was dried to form a 0.5 μm-thick matte layer. A coating liquid, for a hot-melt ink layer, having the following composition was coated on the matte layer by means of a hot-melt coater, and the coating was dried to form a 10 μm-thick hot-melt ink layer.

A coating liquid, for a backside layer, having the following composition was coated on the other side of the substrate film by means of a roll coater, and the coating was dried to form a 0.1 μm-thick backside layer. Thus, a thermal transfer sheet of the present invention was prepared.

| Coating liquid for matte layer | |
| --- | --- |
| Polyester resin (Vylon 200, manufactured by Toyobo Co., Ltd.) | 60 parts |
| Carbon black (Diablack, manufactured by Mitsubishi Chemical Corporation) | 40 parts |
| Methyl ethyl ketone | 100 parts |
| Toluene | 200 parts |
| Coating liquid for hot-melt ink layer | |
| Fired pigment: $Fe_2O_3 \cdot CoO \cdot Cr_2O_3$ | 45 parts |
| Bismuth oxide/borosilicate glass frit (softening point: 440–445° C.) | 30 parts |
| α-Olefin/maleic anhydride copolymer | 20 parts |
| Ethylene/vinyl acetate copolymer (Evaflex 200W, manufactured by DuPont-Mitsui Polychemicals Co., Ltd.) | 6 parts |
| Polyester wax | 7 parts |
| Carnauba wax | 7 parts |
| Paraffin wax (SP-0160, manufactured by Nippon Seiro Co., Ltd.) | 10 parts |
| Rosin ester | 5 parts |
| Coating liquid for backside layer | |
| Polyvinyl butyral resin (S-lec BX-1, manufactured by Sekisui Chemical Co., Ltd.) | 20 parts |
| Talc (Microace L-1, manufactured by Nippon Talc Co., Ltd.) | 30 parts |
| Fine particles of melamine resin (Epostar-S, manufactured by Nippon Shokubai Kagaku Kogyo Co., Ltd.) | 30 parts |
| Polyisocyanate (Takenate A-3, Takeda Chemical Industries, Ltd.) | 40 parts |
| Toluene/methyl ethyl ketone (1/1) | 900 parts |

EXAMPLE 2

A thermal transfer sheet of the present invention was prepared in the same manner as in Example 1, except that the coating liquid for a hot-melt ink layer had the following composition.

| Coating liquid for hot-melt ink layer | |
| --- | --- |
| Fired pigment: $Fe_2O_3 \cdot CoO \cdot Cr_2O_3$ | 45 parts |
| Bismuth oxide/borosilicate glass frit (softening point: 440–445° C.) | 40 parts |
| α-Olefin/maleic anhydride copolymer | 20 parts |
| Ethylene/vinyl acetate copolymer (Evaflex 200W, manufactured by DuPont-Mitsui Polychemicals Co., Ltd.) | 6 parts |
| Polyester wax | 7 parts |
| Carnauba wax | 7 parts |
| Paraffin wax (SP-0160, manufactured by Nippon Seiro Co., Ltd.) | 10 parts |
| Rosin ester | 5 parts |

EXAMPLE 3

A thermal transfer sheet of the present invention was prepared in the same manner as in Example 1, except that the coating liquid for a hot-melt ink layer had the following composition.

| Coating liquid for hot-melt ink layer | |
| --- | --- |
| Fired pigment: $Fe_2O_3 \cdot CoO \cdot Cr_2O_3$ | 45 parts |
| Bismuth oxide/borosilicate glass frit (softening point: 440–445° C.) | 50 parts |
| α-Olefin/maleic anhydride copolymer | 20 parts |
| Ethylene/vinyl acetate copolymer (Evaflex 200W, manufactured by DuPont-Mitsui Polychemicals Co., Ltd.) | 6 parts |
| Polyester wax | 7 parts |
| Carnauba wax | 7 parts |
| Paraffin wax (SP-0160, manufactured by Nippon Seiro Co., Ltd.) | 10 parts |
| Rosin ester | 5 parts |

EXAMPLE 4

A thermal transfer sheet of the present invention was prepared in the same manner as in Example 2, except that no matte layer was provided.

Comparative Example 1

A thermal transfer sheet of the present invention was prepared in the same manner as in Example 4, except that the coating liquid for a hot-melt ink layer had the following composition and the thickness of the hot-melt ink layer was 4 μm.

| Coating liquid for hot-melt ink layer | |
| --- | --- |
| Carbon black (Diablack, manufactured by Mitsubishi Chemical Corporation) | 10 parts |
| Ethylene/vinyl acetate copolymer (Evaflex 200W, manufactured by DuPont-Mitsui Polychemicals Co., Ltd.) | 10 parts |
| Carnauba wax | 15 parts |
| Paraffin wax (SP-0160, manufactured by Nippon Seiro Co., Ltd.) | 60 parts |

Comparative Example 2

A thermal transfer sheet of the present invention was prepared in the same manner as in Example 4, except that the coating liquid for a hot-melt ink layer had the following composition the thickness of the hot-melt ink layer was 8 μm.

| Coating liquid for hot-melt ink layer | |
|---|---|
| Fired pigment: $Fe_2O_3 \cdot CoO \cdot Cr_2O_3$ | 45 parts |
| α-Olefin/maleic anhydride copolymer | 20 parts |
| Ethylene/vinyl acetate copolymer (Evaflex 200W, manufactured by DuPont-Mitsui Polychemicals Co., Ltd.) | 6 parts |
| Polyester wax | 7 parts |
| Carnauba wax | 7 parts |
| Paraffin wax (SP-0160, manufactured by Nippon Seiro Co., Ltd.) | 10 parts |
| Rosin ester | 5 parts |

Printing was performed using the thermal transfer sheets prepared in the above examples and comparative examples under the following printing conditions, and the prints thus obtained were fired at 450° C. for two periods of time, 30 min and 180 min. The prints were evaluated for sensitivity in printing, heat resistance, and acid resistance according to the following criteria.

Printing conditions
Printer: BC8MKII, manufactured by Auto Nics Co., Ltd.
Printing energy: 0.3 mj/dot (different conditions were used for the evaluation of the sensitivity in printing)
Printing speed: 67 mm/sec
Label: Label for firing (layer with ceramic bonded thereto/ inorganic fiber cloth)
Sensitivity in printing Printing of bar codes was carried out with the printing energy varied in 16 stages from 0.23 mj/dot to 0.39 mj/dot, and the prints were read with a bar code scanner. In this case, the minimum printing energy value was determined which could provide bar codes readable with the bar code scanner without creating any error. The sensitivity in printing was evaluated in terms of the energy level.

○: Bar codes were readable when the printing energy was between 0.23 mj/dot and 0.28 mj/dot.

Δ: Bar codes were readable when the printing energy was between 0.29 mj/dot and 0.34 mj/dot.

Heat resistance

Bar codes were printed on a label under the above printing conditions, and firing was carried out at 450° C. for two periods of time, 30 min and 180 min. The reflectance of black of the bar codes was measured with a bar code scanner (AUTOSCAN 7000, manufactured by RJS ENTERPRISES INC.) before and after the firing, and the heat resistance of the print was evaluated from the measured values.

○: Bar codes after firing were readable with a bar code scanner, and the reflectance of black area was 2 to 3% before firing and not more than 12% after firing.

Δ: Bar codes after firing were readable with a bar code scanner, and the reflectance of black area was 2 to 3% before firing and not less than 12% after firing.

x: Bar codes after firing were unreadable with a bar code scanner.

Acid resistance

Solid printing was carried out on a label under the above conditions, and the print was fired in an oven of 450° C. for 30 min. A strong acid, such as amidosulfonic acid, was dropped on the print, and, after standing in this state for a while, the print was washed with water. After the residual water was wiped off, the print was rubbed with a finger to evaluate the fixation of the transferred ink to the label.

⊙: Completely fixed.

○: Fairly fixed, and rubbing resulted in about 10% lowered ink density.

x: Not fixed, and rubbing resulted in separation of ink.

Evaluation results

The results of evaluation on the prints prepared using the thermal transfer sheets of the examples and the comparative examples are summarized in Table 1.

TABLE 1

| | Sensitivity in printing | Heat resistance (fired for 30 min) | Heat resistance (fired for 180 min) | Acid resistance |
|---|---|---|---|---|
| Example 1 | Δ | ○ | ○ | ○ |
| Example 2 | Δ | ○ | ○ | ○ |
| Example 3 | Δ | ○ | ○ | ⊙ |
| Example 4 | ○ | ○ | ○ | ○ |
| Comparative Example 1 | ○ | X | X | X |
| Comparative Example 2 | ○ | ○ | Δ | X |

What is claimed is:

1. A thermal transfer sheet comprising: a substrate film; and a hot-melt ink layer provided on one side of the substrate film, the hot-melt ink layer containing a bismuth oxide/ borosilicate glass frit having a softening point of 400° to 500° C. and consisting essentially of 75 to 85% by weight of $Bi_2O_3$, 12 to 18% by weight of $B_2O_3$, 0.1 to 5.0% by weight of $SiO_2$, 0.05 to 3.0% by weight of $CeO_2$, 0.1 to 3.0% of $Li_2O$ and 0.05 to 3.0% by weight of $Na_2O$.

2. The thermal transfer sheet according to claim 1, further comprising a backside layer.

3. The thermal transfer sheet according to claim 1, further comprising a matte layer between the substrate film and the hot-melt ink layer.

* * * * *